(12) United States Patent
Rama et al.

(10) Patent No.: US 10,325,297 B2
(45) Date of Patent: Jun. 18, 2019

(54) METHOD FOR COMPARING SALES PERFORMANCE OF WEB SITES AND A SYSTEM THEREFOR

(75) Inventors: Kiran Rama, Bangalore (IN); Ranjani Subramaniam, Bangalore (IN); Sagar Balan, Bangalore (IN)

(73) Assignee: DELL PRODUCTS, LP, Round Rock, TX (US)

( * ) Notice: Subject to any disclaimer, the term of this patent is extended or adjusted under 35 U.S.C. 154(b) by 1008 days.

(21) Appl. No.: 13/305,148

(22) Filed: Nov. 28, 2011

(65) Prior Publication Data
US 2013/0138483 A1 May 30, 2013

(51) Int. Cl.
*G06Q 30/06* (2012.01)

(52) U.S. Cl.
CPC .................................. *G06Q 30/06* (2013.01)

(58) Field of Classification Search
USPC .......................................................... 705/14
See application file for complete search history.

(56) References Cited

U.S. PATENT DOCUMENTS

| | | | |
|---|---|---|---|
| 6,014,701 A | 1/2000 | Chaddha | |
| 6,101,485 A | 8/2000 | Fortenberry et al. | |
| 6,253,241 B1 | 6/2001 | Chaddha | |
| 6,405,174 B1 | 6/2002 | Walker et al. | |
| 6,598,026 B1 | 7/2003 | Ojha et al. | |
| 6,704,305 B2 | 3/2004 | Emerson, III | |
| 6,848,046 B2 | 1/2005 | Zimmer | |
| 6,967,575 B1 | 11/2005 | Dohrmann et al. | |
| 7,099,832 B2 | 8/2006 | Walker et al. | |
| 7,363,256 B2 | 4/2008 | Thiam | |
| 7,496,523 B2 | 2/2009 | Walker et al. | |
| 7,516,100 B1 | 4/2009 | Anuszewkski et al. | |
| 7,574,389 B2 | 8/2009 | Anuszewkski et al. | |
| 7,590,570 B2 | 9/2009 | Harrison et al. | |
| 7,617,128 B2 | 11/2009 | Greak | |
| 7,937,322 B2 | 5/2011 | Anuszewkski et al. | |
| 2004/0103299 A1 | 5/2004 | Zimmer et al. | |
| 2007/0156514 A1* | 7/2007 | Wright | G06Q 30/02 705/14.41 |
| 2007/0250691 A1 | 10/2007 | Cool et al. | |
| 2009/0106070 A1* | 4/2009 | Konar | G06Q 30/02 705/14.41 |
| 2011/0258039 A1* | 10/2011 | Patwa | G06Q 30/00 705/14.45 |
| 2011/0302025 A1* | 12/2011 | Hsiao | G06Q 30/02 705/14.42 |

* cited by examiner

*Primary Examiner* — David J Stoltenberg
*Assistant Examiner* — Gautam Ubale
(74) *Attorney, Agent, or Firm* — Larson Newman, LLP

(57) ABSTRACT

A method for comparing sales performance of two web pages includes receiving usage data associated with each web page. The usage data includes next-click visit mix information and sales consummation information. A metric is determined based on a visit mix associated with a link category at a second web page, and further based on a difference between a consummation ratio of the link category at the second web page and a consummation ratio of the link category at a first web page.

12 Claims, 7 Drawing Sheets

METHOD FOR COMPARING SALES PERFORMANCE OF WEB SITES AND A SYSTEM THEREFOR

FIELD OF THE DISCLOSURE

This disclosure relates generally to information handling systems, and relates more particularly to comparing sales performance of web sites using an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Today, information handling systems are integrated in many aspects of a business. This is especially true for businesses that conduct most of their operations online. These so-called electronic (E-) commerce businesses may provide a storefront that can include web pages rendered by a web server, while customers peruse the web pages using a browser implemented on a personal computer. An E-commerce business can utilize additional information handling systems to support sales transactions, inventory management, customer services, and the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

FIGS. 1-7 illustrate an E-commerce performance evaluation system and techniques to identify and quantify factors that contribute to sales. The performance evaluation system can be used to compare the sales performance of a single web page corresponding to two different periods of time, to compare the performance of two different web pages, and the like. The system is configured to store information relating to how users interact with each web page, such as a number of times that each link provided at each web page is selected, how often a selection of each link leads to a purchase, and the number of visits to the web page that do not result in a sale. The performance evaluation system processes the stored information and determines numerical metrics associated with each link, or with groups of links. The metrics allow an E-commerce business to highlight specific factors contributing to an increase or to a decrease in sales.

Figure 1:
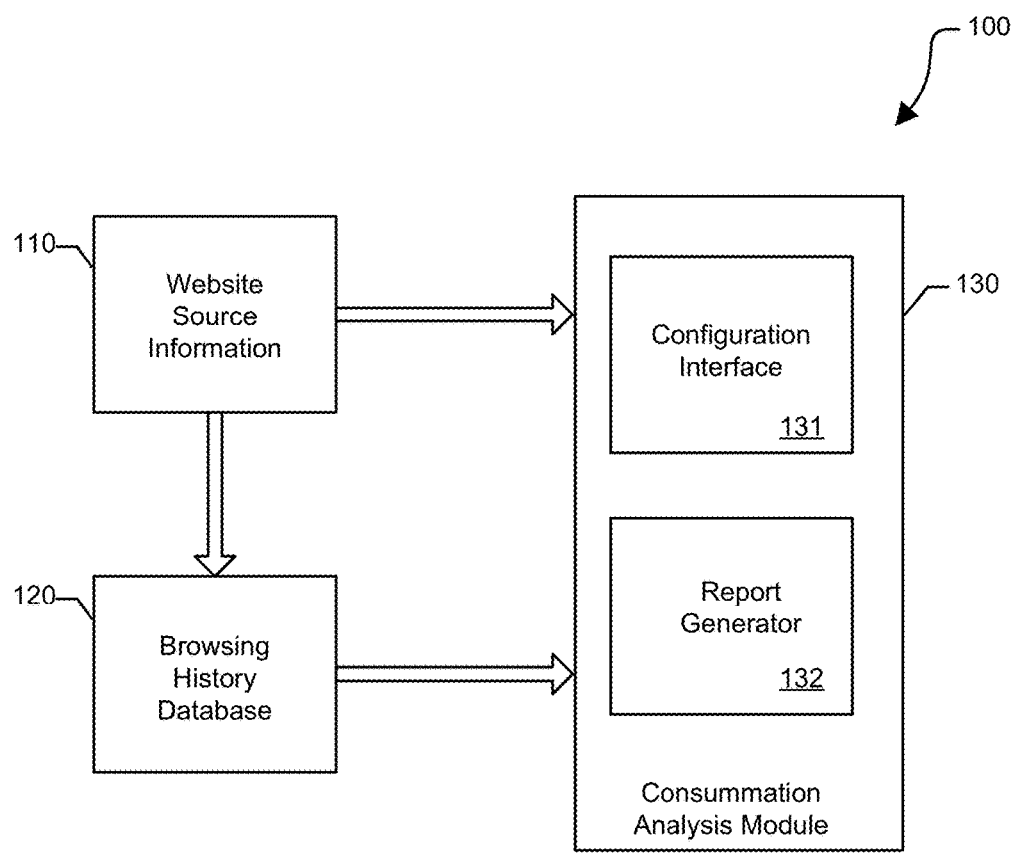
FIG. 1 is a block diagram illustrating an E-commerce performance evaluation system according to an embodiment of the present disclosure.

FIG. 1 shows a block diagram of an E-commerce performance evaluation system 100 according to an embodiment of the present disclosure. The performance evaluation system 100 includes website source information 110, a browsing history database 120, and a consummation analysis module 130. The consummation analysis module 130 includes a configuration interface module 131 and a report generator module 132. The source information 110, the browsing history database 120, and the consummation analysis module 130 can be stored and implemented using one or more information handling systems. For example, an information handling system, such as a web server, can be configured to execute instruction maintained at a physical storage device. The instructions can direct the information handling system to implement the methods disclosed herein.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

The E-commerce performance evaluation system 100 is configured to analyze stored browsing information associated with each of two web pages, and to highlight specific factors that contributed to differences in sales consummation realized at the two pages. The system 100 determines a numerical metric corresponding to each factor based on visit mixes of next-clicked pages and path-wise consummation of next paths. Visit mix is a percentage of times that a particular link at a web page is selected out of the total number of visits to the web page. For example, if three quarters of all visitors to a web page select a particular link, the visit mix associated with the that link is seventy-five percent. Consummation refers to visits to a web page that result in subsequent purchases from an associated web store. Accordingly, consummation ratio refers to a percentage of visits to a web page that consummate in a sale. For example, if half of all visitors to a web page ultimately proceed to complete a purchase, the consummation ratio of the web page is fifty percent. Consummation can also be associated with individual links or groups of links provided at a web page. For example, one link included at a web page may lead to more sales than another link. Thus, path-wise consummation refers to consummation associated with individual links, or groups of links at a web page. Visits to a web page that do not lead to a sale are collectively referred to as leakage.

Figure 2:
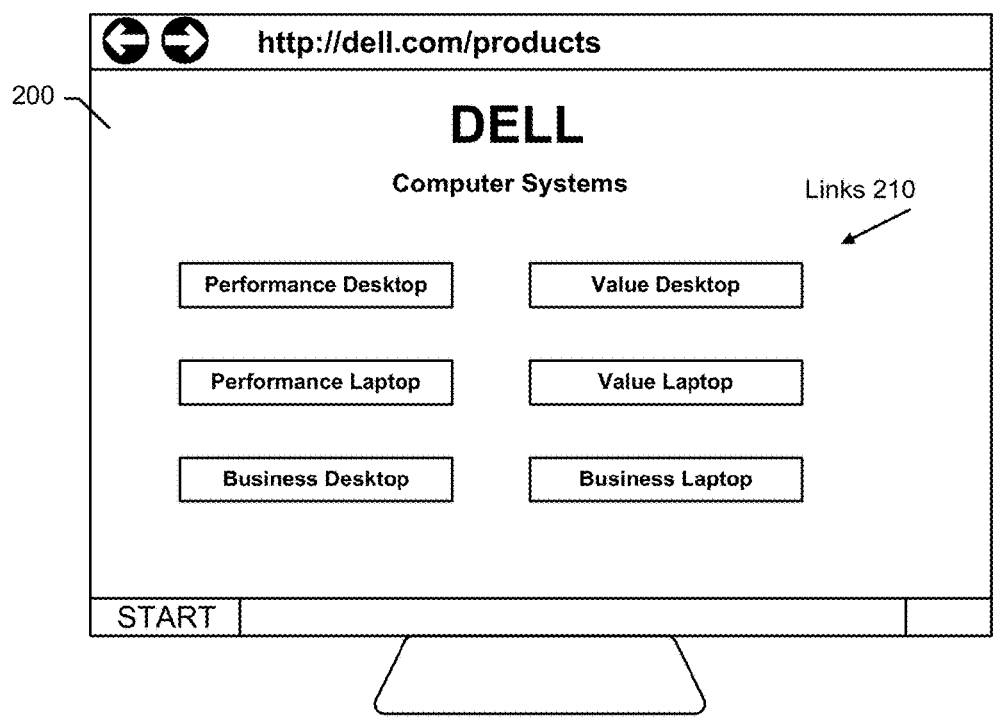
FIG. 2 illustrates a web page associated with an E-commerce business according to an embodiment of the present disclosure.

The website source information 110 can include one or more files or programs that implement web pages. Potential customers can access the web pages using an internet browser or another type of web browser. The website information can be encoded using the Hypertext Markup Language (HTML), a Hypertext Preprocessor scripting language (PHP), and the like. Together, the website information 110 includes all information necessary to implement a web site, such as a home page, menus, links to subordinate web pages, purchasing infrastructure, and the like. For example, an E-commerce business may provide a home page representing a storefront for the business. The home page can include links to allow a prospective customer to navigate to various departments, product lines, individual products, and the like. Product web pages can include links that allow a customer to navigate to an order entry web page where the customer can purchase the respective product. For example, FIG. 2 shows a web page 200 associated with an E-commerce business according to an embodiment of the present disclosure. The web page 200 includes links 210 that a user can select to navigate to other pages, which together implement a web site of the business. Subordinate web pages can include links to yet other web pages, including web pages configured to allow a customer to make a purchase. An E-commerce website, like the layout of a physical store, can lead to a difference in sales. Therefore, it is desired to optimize the layout of E-commerce web pages to improve sales.

Figure 3:
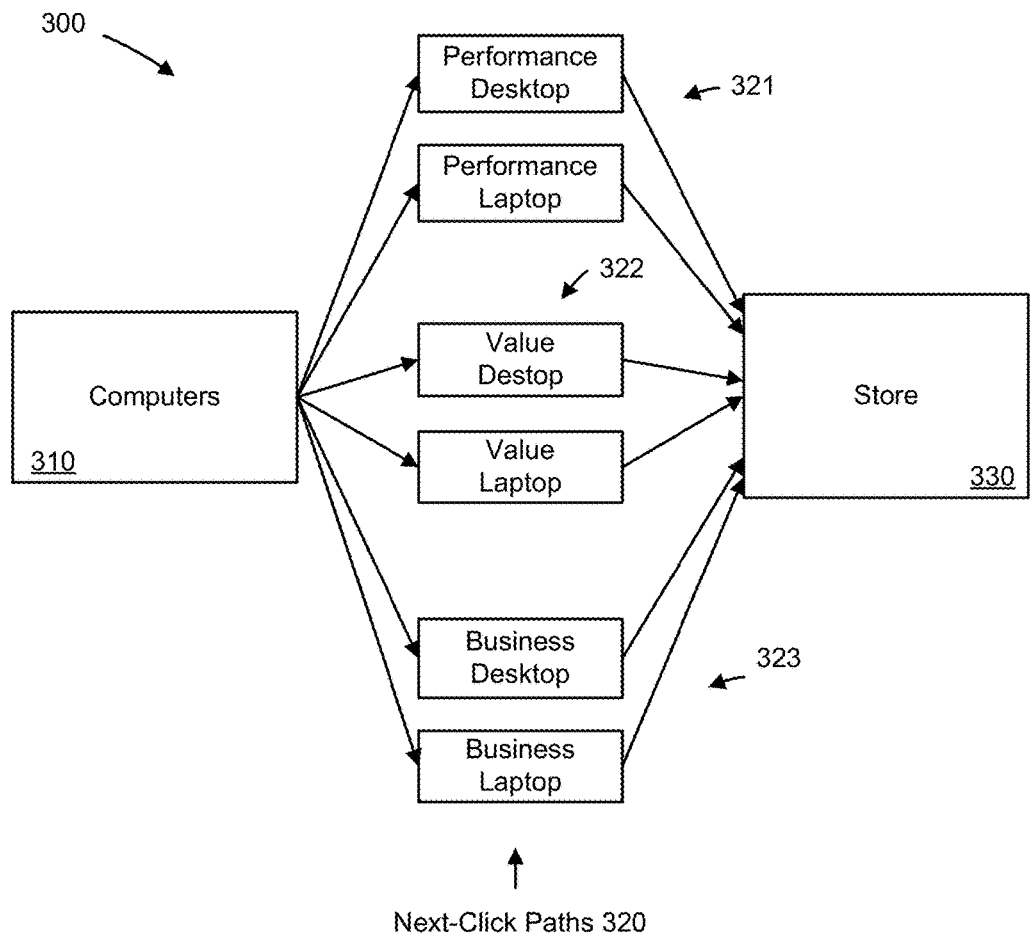
FIG. 3 is a block diagram illustrating next-click paths associated with an E-commerce web site according to an embodiment of the present disclosure.

The browsing history database 120 is configured to store a record of how each perspective customer interacts with the web pages that constitute an E-commerce web site. For example, the database 120 can store a record of which links a customer selected at each web page and whether the customer eventually initiated a purchase. For example, FIG. 3 shows a block diagram 300 illustrating next-click paths associated with an E-commerce web site according to an embodiment of the present disclosure. The diagram 300 includes a source page 310, which can correspond to the web page 200 at FIG. 2, and includes links associated with various types of desktop and laptop computers. Next-click paths 320 represent navigation away from the source page 310 to other web pages. A visitor to the source page 310 may eventually navigate to a store 330, where they can initiate purchase of a product.

Individual links at the web page 200 can be partitioned into two or more categories, also referred to as buckets, based on some differentiating criteria. For example, links corresponding to performance desktop and performance laptop computers can be combined at a bucket 321 corresponding to performance rated computers, and links corresponding to value desktop and value laptop computers can be combined at a bucket 322 corresponding to value rated computers. Similarly, business desktop and business laptop computers can be combined at a bucket 323 corresponding to business computers. Accordingly, the visit mix associated with the source page 310 can be described in terms of the classifications performance, value, and business. The classification of links into respective buckets can be performed based on any desired criterion. For example, the links shown at the web page 200 can be divided into two buckets, one corresponding to desktop computers and another corresponding to laptop computers. For still another example, links can be categorized based on web site resources such as a product search system, a product comparison system, technical support web pages, banner advertisements, and the like.

A visit mix at a web page can be expressed based on a collection of links included at predetermined buckets instead of based on individual links. For example, if eighty percent of all visitors to the source page 310 select either of the links included in the performance computer bucket, the visit mix associated with performance-rated computers is said to be eighty percent. Continuing with the present example, if half of all visitors to the source page 310 who select one of the links associated with the performance computer bucket proceed to make a purchase, the consummation ratio of performance computers is forty percent (half of eighty percent of visitors that selected one of the computer links made a purchase). Visits to the source page 310 that do not lead to a sale are included in a single bucket and referred to as leakage. For example, if ten percent of all visitors to the source page 310 do not proceed to make a purchase, the leakage for the time period that is being evaluated is said to be ten percent. The layout of web pages plays a significant role in the visit mix. Prominent areas of the webpage are likely to receive a disproportionately large number of visits. For example, a customer may be more likely to click links that are readily visible compared to links that are only viewable after scrolling lower on a web page. Therefore, the design of a web page can play an important role in determining the visit mix.

Figure 4:
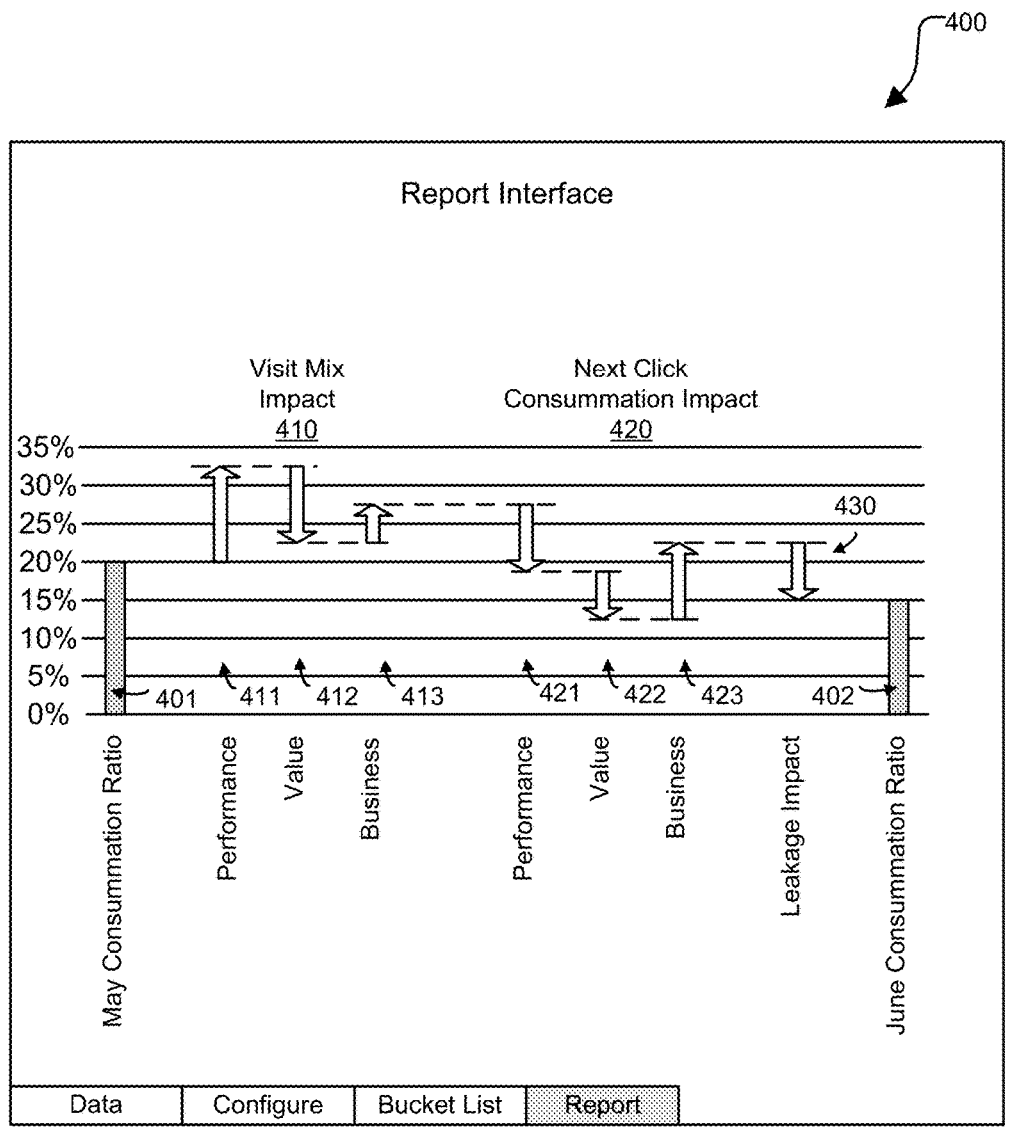
FIG. 4 is a diagram illustrating a report generated by the E-commerce performance evaluation system of FIG. 1 according to an embodiment of the present disclosure.

FIG. 4 shows a report 400 generated by the E-commerce performance evaluation system 100 of FIG. 1 according to an embodiment of the present disclosure. The report 400 compares the sales performances of a web page during one period of time compared to the sales performance of the same web page at a different period of time. For the purpose of example, the report 400 compares the total consummation ratio of the web page 200 of FIG. 2 during the month of June to the total consummation ratio of the web page 200 during the month of May. In particular, the left-most histogram bar 401 shows that the consummation ratio of the combination of all links at the web page during May was twenty percent, and the right-most histogram bar 402 shows that the consummation ratio of the combination of all links at the web page during June was fifteen percent. Therefore, the average consummation declined by five percent. The report 400 identifies specific factors that contributed to the reduction in the number of sales. For the present example, the analysis module 130 of FIG. 1 has calculated visit mix impact factors 410 and next click consummation impact factors 420, each factor corresponding to one of the three predetermined buckets of next click paths. The first bucket is labeled PERFORMANCE and includes the performance desktop link and the performance laptop link of links 210. The second bucket is labeled VALUE and includes the value desktop link and the value laptop link of links 210. The third bucket is labeled BUSINESS and includes the business desktop link and the business laptop link of links 210. One skilled in the art will appreciate that other groupings are possible. For example, the links 210 can be divided into two groups, one group including all links associated with desktop computers and another link associated with all laptop computers. Furthermore, grouping of links is not necessary and the consummation analysis module 130 can provide visit mix impact and next click consummation impact information associated with individual links.

The report 400 can be referred to as a bridge graph because the individual factors, when summed together, are equal to the difference between the total consummation ratios of each of the two web pages that are being compared. Accordingly, each factor can be graphically displayed to convey how that factor contributes, positively or negatively, to the net difference in consummation of the two web pages. The visit mix impact factors 410 include factors 411, 412, and 413, corresponding to the three buckets, performance, value, and business, respectively. The next click consummation impact factors 420 include factors 421, 422, and 423, corresponding to the buckets performance, value, and business, respectively. In addition, a leakage impact factor 430 further contributes to the difference in consummation.

The E-commerce performance evaluation system 100 determines the individual factors 410 and 420 using information stored at the browsing history database. To simplify the following discussion, a web page having only two links (or two buckets of links) is described in detail. The present example includes two web pages and corresponding browsing history for each. The two web pages can be identical, wherein the browsing history corresponds to two different periods of time, or the two web pages can be different. In the case that the web pages are different, links included at each are similarly classified into buckets sharing common attributes. For example, a first web page offering performance desktop computers and value desktop computers can be compared to another web page offering performance laptop computers and value laptop computers, wherein the links included at each page can be classified into the buckets Performance and Value. The notation X will be used to refer to a first web page and the notation X' will be used to refer to a second web page. Accordingly, $C_X$ refers to the total consummation ratio of page X, and $C_{X'}$ refers to the total consummation ratio of page X'.

The difference between the total consummation ratios of each web page is therefore $C_{X'}$ minus $C_X$. For example, with reference to the report 400 at FIG. 4, $C_X$ can refer to the total consummation ratio of the web page 200 during the month of May, and $C_{X'}$ can refer to the total consummation ratio of the web page during the month of June. Therefore, the difference in consummation ratio between June and May can be expressed as 15% minus 20%, or negative 5%.

For the present example, each of web pages X and X' includes two paths (links or buckets of links), denoted as A and B. Accordingly, $C_{XA}$ refers to the consummation ratio of next page path A, and $C_{XB}$ refers to the total consummation ratio of next page path B.

Further, $V_X$ denotes the total visits to page X;

$VL_X$ denotes the total leakage visits of page X;

$V_{XA}$ denotes visits to path A from page X;

$V_{XB}$ denotes visits to path B from page X;

$SV_{XA}$ denotes store visits associated with path A for page X;

$SV_{XB}$ denotes store visits associated with path B for page X;

$V_{MA}$ denotes a visit mix of path A for page X, $$\frac{V_{XA}}{V_X}; \text{ and}$$

$V_{MB}$ denotes a visit mix of path B for page X, $$\frac{V_{XB}}{V_X}.$$

Similarly, $V_{X'}$ denotes the total visits to page X';

$VL_{X'}$ denotes the total leakage visits of page X';

$V_{XA'}$ denotes visits to path A from page X';

$V_{XB'}$ denotes visits to path B from page X';

$SV_{XA'}$ denotes store visits associated with path A for page X';

$SV_{XB'}$ denotes store visits associated with path B for page X';

$V_{MA'}$ denotes a visit mix of path A for page X', $$\frac{V'_{XA}}{V'_X}; \text{ and}$$

$V_{MB'}$ denotes a visit mix of path B for page X', $$\frac{V'_{XB}}{V'_X}.$$

The total consummation ratio $C_X$ of page X can be expressed as the ratio of the number of store visits associated with page X, $S_{VX}$, to the total number of visits to page X, $V_X$:

$$C_X = \frac{S_{VX}}{V_X} = \frac{SV_{XA} + SV_{XB}}{V_X};$$

$$C_X = \frac{SV_{XA}}{V_X} + \frac{SV_{XB}}{V_X};$$

-continued $$C_X = \frac{SV_{XA}}{V_{XA}} * \frac{V_{XA}}{V_X} + \frac{SV_{XB}}{V_{XB}} * \frac{V_{XB}}{V_X}; \text{ and}$$

$$C_X = C_{XA} * V_{MA} + C_{XB} * V_{MB}$$

Thus, total consummation associated with a page X (denoted as CX) having two next-click paths, A and B, is equal to the consummation associated with path A, denoted as $C_{XA}$, multiplied by the visit mix associated with path A (visits from page X to links associated with path A), denoted as $V_{MA}$ and the consummation associated with path B, denoted as $C_{XB}$, multiplied by the visit mix associated with path B (visits from page X to links associated with path B), denoted as $V_{MB}$.

Similarly, the total consummation ratio $C_{X'}$ of page X' can be expressed as:

$$C_{X'} = C_{XA}'*V_{MA}' + C_{XB}'*V_{MB}'$$

A difference in total consummation ratio of page X and page X', ΔC, can therefore be expressed as:

$$\Delta C = C_{X'} - C_X; \text{ and}$$

$$\Delta C = (C_{XA}'*V_{MA}' + C_{XB}'*V_{MB}') - (C_{XA}*V_{MA} + C_{XB}*V_{MB})$$

Add and Subtract $C_{XA}*V_{MA}'$ and $C_{XB}*V_{MB}'$ $$\Delta C = C_{XA}'*V_{MA}' + (-C_{XA}*V_{MA}' + C_{XA}*V_{MA}') + C_{XB}'*V_{MB}' + (-C_{XB}*V_{MB}' + C_{XB}*V_{MB}') - C_{XA}*V_{MA} + C_{XB}*V_{MB}; \text{ or}$$

$$\Delta C = V_{MA}'*(C_{XA}' - C_{XA}) + V_{MB}'*(C_{XB}' - C_{XB}) + C_{XA}*(V_{MA}' - V_{MA}) + C_{XB}*(V_{MB}' - V_{MB}); \text{ or}$$

$$\Delta C = (V_{MA}'*\Delta C_{XA}) + (V_{MB}'*\Delta C_{XB}) + (C_{XA}*\Delta V_{MA}) + (C_{XB}*\Delta V_{MB})$$

Therefore, the difference in the total consummation ratio of page X and of page X', (ΔC) can be expressed as the sum of four factors:

$V_{MA}'*\Delta C_{XA}$ referred to herein as visit mix impact for path A;
$V_{MB}'*\Delta C_{XB}$ referred to herein as visit mix impact for path B;
$C_{XA}*\Delta V_{MA}$ referred to herein as next click consummation impact for path A; and
$C_{XB}*\Delta V_{MB}$ referred to herein as next click consummation impact for path B.

Accordingly, consummation of a web page can be represented as a function of visit mix of the several paths included at a page and consummation of each of the individual paths, providing businesses with insights on how best to improve the sales performance of a web page. For example, visit mix of next-click paths can be adjusted by rearranging the layout of the web page. Alternatively, consummation degradation on the next-click paths resulting in a decrease in consummation of the main page indicates next-click pages/paths that need improvement.

One skilled in the art will appreciate that the preceding mathematical proof can be expanded to include more than two buckets. For example, the report 400 of FIG. 4 includes three buckets and therefore yields the three visit mix impact factors 411, 412, and 413, and the three next click consummation impact factors 421, 422, and 423. Factor 411 has a value of approximately positive 12.5%, indicating that the fraction of visitors to the new page X' who selected a link associated with the performance bucket has increased relative to the number of visitors who selected these links at the old page X. Factor 412 has a value of approximately negative 10%, indicating that the fraction of visitors to the new page X' who selected a link associated with the value bucket has decreased relative to the number of visitors who selected these links at the old page X. Factor 413 has a value of approximately positive 5%, indicating that the fraction of visitors to the new page X' who selected a link associated with the business bucket has increased relative to the number of visitors who selected these links at the old page X. Because each visit mix impact factor is weighted based on a change in consummation ratio for that bucket, the relative importance of each bucket is made more apparent. For example, the report 400 shows that links associated with the performance bucket have contributed to the total consummation ratio of the new web page X' to a greater extent than links associated with the business bucket, and that the total consummation ratio of the new web page X' was negatively impacted due to a decrease in the number of visitors who selected a link associated with the value bucket.

Next click consummation impact factors 421, 422, and 423 represent the original consummation ratio associated with each bucket weighted by a change in the visit mix of page X' relative to the visit mix of page X. For example, the report 400 shows that the next click consummation impact associated with the performance and value buckets negatively impact the change in the total consummation ratio of the new page X', while an increase in the next click consummation impact associated with the business bucket has helped offset this decline. Finally, leakage impact 430 is simply the difference between an amount of leakage associated with the page X' and an amount of leakage associated with the page X. For example, report 400 shows that the leakage impact 430 has a value of approximately negative 7.5%, indicating that leakage at the new page X' is less than the leakage at the old page X. It can be seen that the sum of each visit mix impact factor 411-413, each next click consummation impact factor 421-423, and the leakage impact 430, is equal to the difference between the total consummation ratio of the web page during June and the total consummation ratio of the web page during May.

Figure 5:
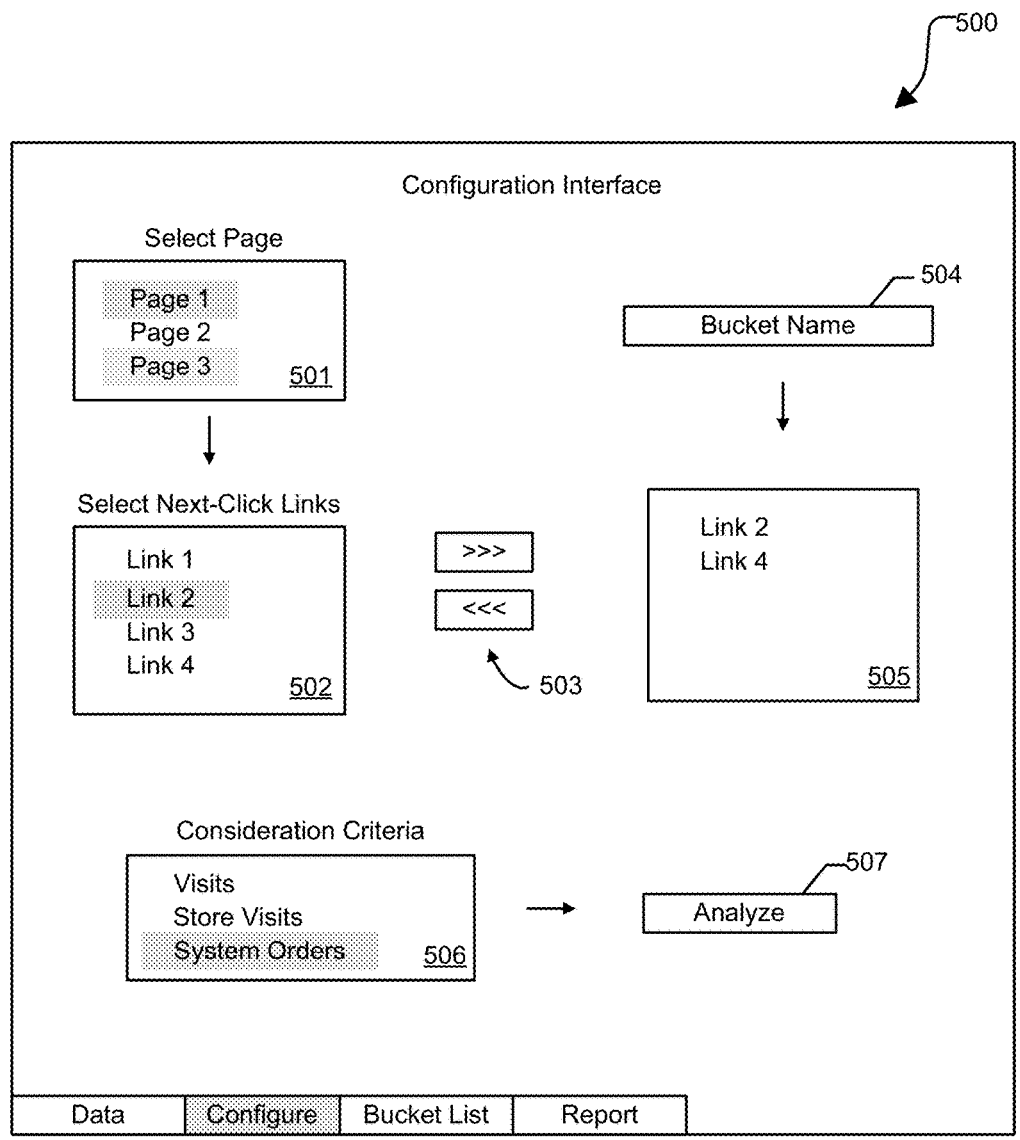
FIG. 5 is a diagram illustrating an interface for configuring the E-commerce performance evaluation system of FIG. 1 according to an embodiment of the present disclosure.

FIG. 5 is a diagram illustrating an interface 500 for configuring the E-commerce performance evaluation system of FIG. 1 according to an embodiment of the present disclosure. The interface 500 allows a user to associate links at each web page being compared to corresponding buckets. The interface 500 includes a page selection menu 501, a link selection menu 502, add/remove buttons 503, a bucket name entry window 504, a bucket association window 505, a consideration criteria menu 506, and an analyze button 507. The configuration interface 500 can be generated and managed by the configuration interface module 131 of FIG. 1.

During operation, a user can select a first web page, such as PAGE 1, using page selector 501. In response, the configuration interface module 131 displays a list of all links included at the first page at the menu 502. The user may now proceed to enter a first bucket name at window 504, and use the add/remove buttons 503 to select one or more links included at the menu 502 that are to be associated with the first bucket. The selected links appear at the bucket association window 505. The user may now proceed to enter a second bucket name at the window 504 and once again select links included at the menu 502 that are to be associated with the second bucket. This process is generally repeated until all links included at the first web page have been categorized into respective buckets. The user repeats this process for a second page, such as PAGE 3, using the same set of buckets defined for the first page. Once all links have been categorized into respective buckets, the user can select the analyze button 507, and the report generator 132 will analyze the information stored at the browsing history database 120 and prepare a report, such as the report 400 of FIG. 4. In an embodiment, the consideration criteria 506 menu can be used to select a particular type of report of interest. For example, the report 400 described above is representative of consummation, the number of visits to the web pages that ultimately resulted in system orders. Alternatively, consummation may merely represent visits to the web store regardless of whether a purchase was made.

Figure 6:
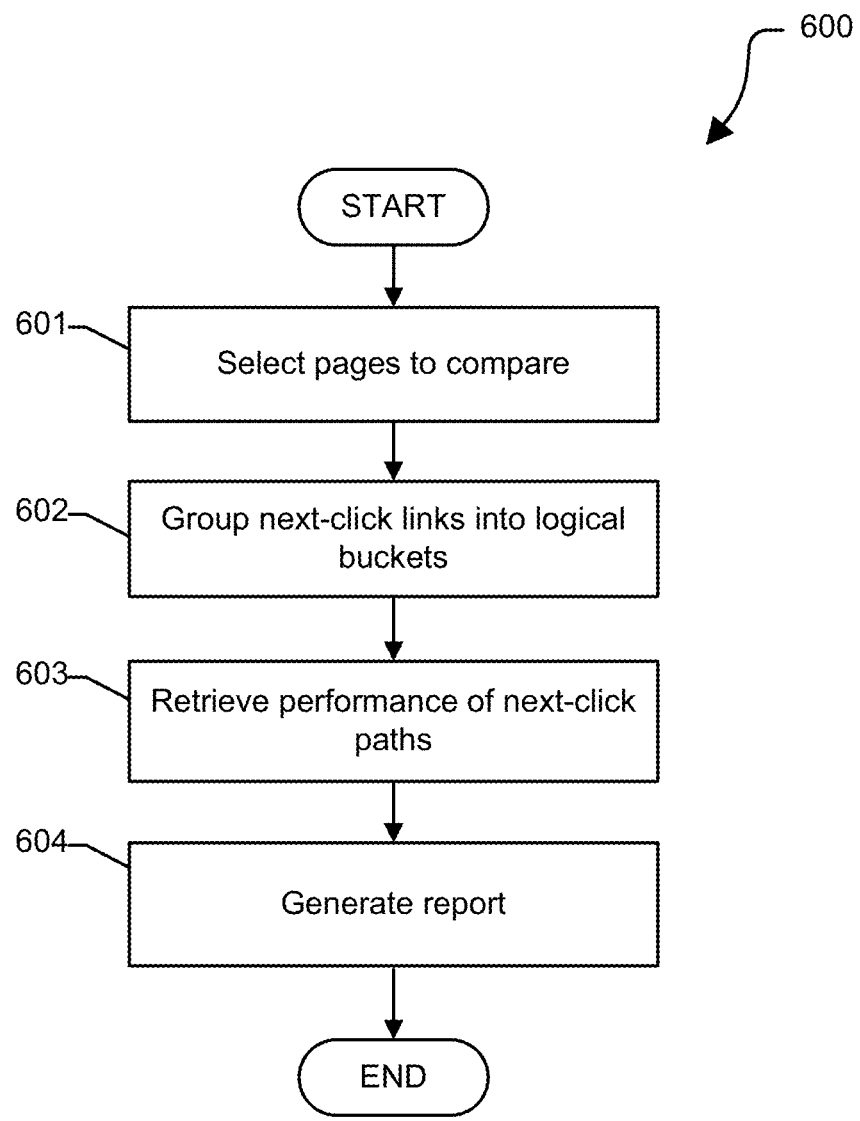
FIG. 6 is a flow diagram illustrating a method according to an embodiment of the present disclosure.

FIG. 6 is a flow diagram illustrating a method 600 according to an embodiment of the present disclosure. The flow begins at block 601 where two pages are selected for comparison. The flow proceeds to block 602 where links at each page are grouped into logical buckets. For example, the configuration interface 500 can be used to identify a first page and a second page, and to identify a respective bucket for each link included at the two pages. The flow proceeds to the block 603 where the consummation analysis module 130 retrieves browser history information from the browsing history database 120 and calculates the values of each individual impact factor, such as the visit mix impact factors 410 and the next click consummation impact factors 420. The flow proceeds to block 604 where a report is generated and provided to a user of the E-commerce performance evaluation system 100. For example, the report generator 132 can provide a bridge graph similar to the report 400.

Figure 7:
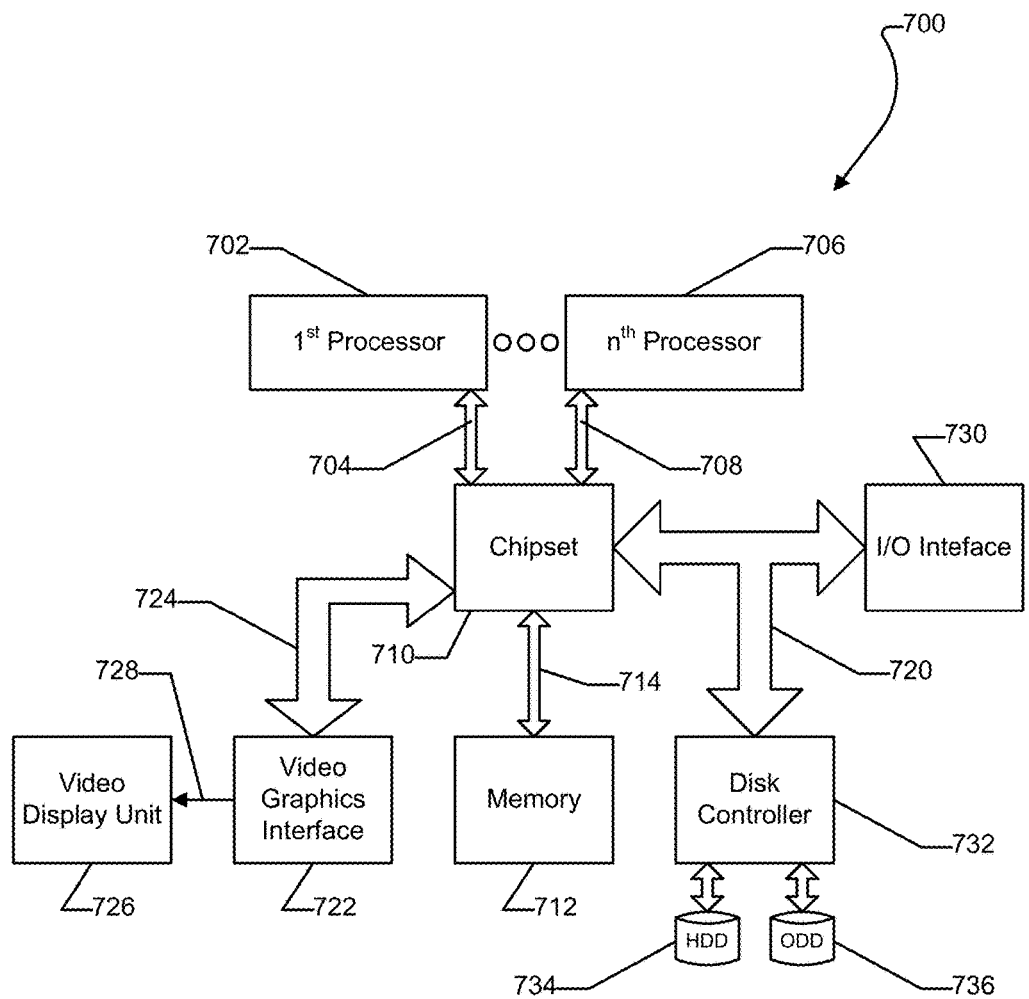
FIG. 7 illustrates a block diagram of an information handling system according to one aspect of the disclosure.

FIG. 7 illustrates a block diagram of an exemplary embodiment of an information handling system, generally designated at 700. The information handling system 700 can be used to implement one or more methods disclosed herein, such as the method 600 of FIG. 6. In one form, the information handling system 700 can be a computer system such as a server. As shown in FIG. 7, the information handling system 700 can include a first physical processor 702 coupled to a first host bus 704 and can further include additional processors generally designated as $n^{th}$ physical processor 106 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 100 during multiple processing operations.

According to one aspect, the chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

According to another aspect, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be an Accelerated Graphics Port (AGP) interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the $n^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

What is claimed is:

1. A method implemented using a computer for comparing sales performance of a first web page and a second web page at an E-commerce web site, the method comprising:
   receiving, by a server, uniform resource locators sent from web browsers associated with client devices, the uniform resource locators describing selections of website links in the first web page and within the second web page;
   storing, by the server, the uniform resource locators as records in a browsing history database, each record of the records electronically associating the uniform resource locators to a corresponding client device of the client devices;
   determining, by the server from the uniform resource locators, a first visit mix of a first link category, the first visit mix of the first link category representing a fraction of the selections of the website links sent from the web browsers associated with mobile devices of the client devices;
   determining, by the server from the uniform resource locators, a second visit mix of a second link category, the second visit mix of the second link category representing the fraction of the selections of the website links sent from the web browsers operating within desktop computers of the client devices;
   determining, by the server from the uniform resource locators, a first consummation ratio associated with the first visit mix, the first consummation ratio representing the fraction of the selections of the website links sent from the web browsers associated with the mobile devices that result in a purchase; and
   determining, by the server from the uniform resource locators, a second consummation ratio associated with the second visit mix, the second consummation ratio representing the fraction of the selections of the website links sent from the web browsers associated with the desktop computers that result in the purchase;
   comparing, by the server, the first visit mix to the second visit mix; comparing, by the server, the first consummation ratio to the second consummation ratio;
   associating, by the server, a link pathway in the first web page to a difference between the first consummation ratio and the second consummation ratio; and
   altering, by the server, a layout of the second web page based on the link pathway.

2. The method of claim 1 further comprising comparing, by the E-commerce performance evaluation system, a sales performance of the first web page and the second web page based on:
   the first consummation ratio of the first link category at the first web page; and
   a difference between the first visit mix of the first link category at the second web page and the first visit mix of the first link category at the first web page.

3. The method of claim 2 further comprising comparing, by the E-commerce performance evaluation system, a sales performance of the first web page and the second web page based on:
   the second consummation ratio of the second link category at the first web page; and
   a difference between the second visit mix of the second link category at the second web page and the second visit mix of the second link category at the first web page.

4. The method of claim 1 further comprising comparing, by the E-commerce performance evaluation system, a sales performance of the first web page and the second web page based on a sum of:
   a product associated with the first consummation ratio of the first link category at the first web page and a difference between the first visit mix of the first link category at the second web page and the first visit mix of the first link category at the first web page; and
   a product associated with the second consummation ratio of the second link category at the first web page and a difference between the second visit mix of the second link category at the second web page and the second visit mix of the second link category at the first web page.

5. The method of claim 1 wherein the first webpage and the second webpage are different.

6. An information handling system comprising: a memory device;
   a microprocessor operatively connected to the memory device for executing computer-readable code stored in the memory; and
   a computer-readable program code stored in the memory device and executable by the microprocessor to implement an E-commerce performance evaluation system, the E-commerce performance evaluation system to:
   receive uniform resource locators sent from web browsers associated with client devices, the uniform resource locators describing selections of website links in a first web page and in a second web page;
   storing the uniform resource locators as records in a browsing history database, each record of the records electronically associating the uniform resource locators to a corresponding client device of the client devices;
   determining a first visit mix of a first link category, the first visit mix of the first link category representing a fraction of the selections of the website links sent from the web browsers associated with mobile devices of the client devices;
   determining a second visit mix of a second link category, the second visit mix of the second link category representing the fraction of the selections of the website links sent from the web browsers associated with desktop computers of the client devices;
   determining a first consummation ratio associated with the first link category, the first consummation ratio representing the fraction of the selections of the website links sent from the web browsers associated with the mobile devices that result in a purchase following a selection of a link included at the first link category; and
   determining a second consummation ratio associated with the second link category, the second consummation ratio representing the fraction of the selections of the website links sent from the web browsers associated with the desktop computers that result in the purchase following a selection of a link included at the second link category;
   comparing the first visit mix to the second visit mix;
   comparing the first consummation ratio to the second consummation; associating a link pathway in the first web page to a difference between the first consummation ratio and the second consummation ratio; and altering a layout of the second web page based on the link pathway.

7. The system of claim 6 further comprising program code to compare a sales performance of the first web page and the second web page.

8. The system of claim 7 further comprising program code to compare a sales performance of the first web page and the second web page based on the second consummation ratio.

9. The system of claim 6 further comprising program code to compare a sales performance of the first web page and the second web page based on the first consummation ratio.

10. The system of claim 6 wherein the first webpage and the second webpage are different.

11. A non-transitory computer readable medium storing a set of instructions, the set of the instructions comprising instructions to manipulate a processing system to implement an E-commerce performance evaluation system, the E-commerce performance evaluation system to:

receive uniform resource locators sent from web browsers associated with client devices, the uniform resource locators describing selections of website links in a first web page and in a second web page;

store the uniform resource locators as records in a browsing history database, each record of the records electronically associating the uniform resource locators to a corresponding client device of the client devices;

determine a first visit mix of a first link category, the first visit mix of the first link category representing a fraction of the selections of the website links sent from the web browsers associated with mobile devices of the client devices;

determine a second visit mix of a second link category, the second visit mix of the second link category representing the fraction of the selections of the website links sent from the web browsers associated with desktop computers of the client devices;

determine a first consummation ratio associated with the first link category, the first consummation ratio representing the fraction of the selections of the website links sent from the web browsers associated with the mobile devices that result in a purchase following selection of a link included at the first link category; and determine a second consummation ratio associated with the second link category, the second consummation ratio representing the fraction of the selections of the website links sent from the web browsers associated with the desktop computers that result in the purchase following selection of a link included at the second link category;

compare the first visit mix to the second visit mix;

compare the first consummation ratio to the second consummation ratio; associate a link pathway in the first web page to a difference between the first consummation ratio and the second consummation ratio; and alter a layout of the second web page based on the link pathway.

12. The computer readable medium of claim 11 further comprising instructions to compare a sales performance of the first web page and the second web page.

\* \* \* \* \*